US010783328B2

(12) United States Patent
Akbik et al.

(10) Patent No.: US 10,783,328 B2
(45) Date of Patent: Sep. 22, 2020

(54) SEMI-AUTOMATIC PROCESS FOR CREATING A NATURAL LANGUAGE PROCESSING RESOURCE

(71) Applicant: International Business Machines Corporation, Armonk, NY (US)

(72) Inventors: Alan Akbik, San Francisco, CA (US); Laura Chiticariu, San Jose, CA (US); Yunyao Li, San Jose, CA (US); Anbang Xu, San Jose, CA (US); Victor K. Ondego, Baltimore, MD (US); Chenguang Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/997,093

(22) Filed: Jun. 4, 2018

(65) Prior Publication Data

US 2019/0370333 A1    Dec. 5, 2019

(51) Int. Cl.
| | |
|---|---|
| *G06F 16/00* | (2019.01) |
| *G06F 40/00* | (2020.01) |
| *G06F 40/30* | (2020.01) |
| *G06F 16/35* | (2019.01) |
| *G06F 40/169* | (2020.01) |

(52) U.S. Cl.
CPC ............. *G06F 40/30* (2020.01); *G06F 16/35* (2019.01); *G06F 40/169* (2020.01)

(58) Field of Classification Search
CPC ................................ G06F 16/93; G06F 40/00
See application file for complete search history.

(56) References Cited

U.S. PATENT DOCUMENTS

| | | |
|---|---|---|
| 5,116,180 A | 5/1992 | Fung et al. |
| 8,131,756 B2 | 3/2012 | Carus et al. |
| 9,152,623 B2 * | 10/2015 | Wroczyski ............ G06F 40/211 |

(Continued)

OTHER PUBLICATIONS

Babko-Malaya, O., Propbank Annotation Guidelines, Sep. 2005.

(Continued)

*Primary Examiner* — Shreyans A Patel
(74) *Attorney, Agent, or Firm* — Ryan, Mason & Lewis, LLP (57) ABSTRACT

Methods, systems, and computer program products for a semi-automatic process for creating a natural language processing resource are provided herein. A computer-implemented method includes identifying multiple annotation tasks in connection with natural language processing of input text, and automatically determining, based on analysis of (i) parameters related to the identified annotation tasks and (ii) parameters related to annotation task users, routing instructions for the identified annotation tasks, wherein the routing instructions comprise (a) instructions to route a first sub-set of the identified annotation tasks to non-expert annotation task users and (b) instructions to route a second sub-set of the identified annotation tasks to expert annotation task users. The method also includes routing, in accordance with the routing instructions, the first sub-set of the identified annotation tasks to the non-expert annotation task users and the second sub-set of the identified annotation tasks to the expert annotation task users.

20 Claims, 7 Drawing Sheets

(56) References Cited

U.S. PATENT DOCUMENTS

| | | | |
|---|---|---|---|
| 9,665,550 B2* | 5/2017 | Lee | G06F 40/169 |
| 2004/0078190 A1* | 4/2004 | Fass | G06F 40/268 |
| | | | 704/7 |
| 2016/0062982 A1 | 3/2016 | Wroczynski et al. | |
| 2016/0162458 A1* | 6/2016 | Munro | G06F 16/93 |
| | | | 715/230 |

OTHER PUBLICATIONS

IP.com, Crowd Sourced Relabeling of Low Confidence Classifications of Document Sentiment, Jun. 6, 2012.
IP.com, Productive Method for Large Scale Time Aligned Phonetic Annotation of Speech, Jan. 17, 2011.
Aberdeen et al., MITRE: Description of the Alembic system used for MUC-6, 1995.
Wang and Hoang et al., Perspectives on Crowdsourcing Annotations for Natural Language Processing, Jul. 2010.
Alan Akbik and Yunyao Li. 2016. K-srl: Instance-based learning for semantic role labeling. In Proceedings of Coling 2016, the 26th International Conference on Computational Linguistics, pp. 599-608.
Alan Akbik, Kumar Vishwajeet, and Yunyao Li. 2016. Towards semi-automatic generation of proposition banks for low-resource languages. In Conference on Empirical Methods on Natural Language Processing, pp. 993-998.
Baker et al., 1998. The Berkeley Framenet Project. In Annual Meeting of the Association for Computational Linguistics, pp. 86-90.
Bozzon et al., 2013. Choosing the right crowd: expert finding in social networks. In Proceedings of the 16th International Conference on Extending Database Technology, pp. 637-648.
Bragg et al., 2014. Parallel task routing for crowdsourcing. In Second AAAI Conference on Human Computation and Crowdsourcing.
Fader et al., 2011. Identifying relations for open information extraction. In Conference on Empirical Methods on Natural Language Processing, pp. 1535-1545.
Feizabadi et al., 2014. Crowdsourcing annotation of non-local semantic roles. In European Chapter of the Association for Computational Linguistics, pp. 226-230.
Fossati et al., 2013. Outsourcing framenet to the crowd. In Annual Meeting of the Association for Computational Linguistics(2), pp. 742-747.
Franklin et al., 2011. Crowddb: answering queries with crowdsourcing. In Proceedings of the 2011 ACM SIGMOD International Conference on Management of data, pp. 61-72.
Hajic et al., 2009. The CoNLL-2009 shared task: Syntactic and semantic dependencies in multiple languages. In Proceedings of the Thirteenth Conference on Computational Natural Language Learning: Shared Task, pp. 1-18.
Hassan et al., 2013. A capability requirements approach for predicting worker performance in crowdsourcing. In Collaborative Computing: Networking, Applications and Worksharing (Collaboratecom), 2013 9th International Conference Conference on, pp. 429-437.
He and Lewis et al., 2015. Question-answer driven semantic role labeling: Using natural language to annotate natural language. In Conference on Empirical Methods on Natural Language Processing, pp. 643-653.
He and Michael et al., 2016. Human-in-the-loop parsing. In Conference on Empirical Methods in Natural Language Processing.
Hong et al., 2011. How good is the crowd at real wsd? In Proceedings of the 5th linguistic annotation workshop, pp. 30-37.
Hovy et al., 2006. Ontonotes: the 90% solution. In Human Language Technology Conference of the NAACL, pp. 57-60.
Ishibuchi et al., 1995. Selecting fuzzy if-then rules for classification problems using genetic algorithms. IEEE Transactions on fuzzy systems, 3(3):260-270.
Li et al., 2016. Dialogue learning with human-in-the-loop. arXiv preprint arXiv:1611.09823.
Lo et al., 2013. Improving machine translation into chinese by tuning against chinese meant. In IWSLT 2013, 10th International Workshop on Spoken Language Translation.
Palmer et al., 2005. The proposition bank: An annotated corpus of semantic roles. Computational linguistics, 31(1):71-106.
Patterson et al., 2013. Bootstrapping fine-grained classifiers: Active learning with a crowd in the loop. In Neural Information Processing Systems (Workshop).
Pavlick et al., 2015. Framenet+: Fast paraphrastic tripling of framenet. pages 408-413.
Shen et al., 2007. Using semantic roles to improve question answering. In Conference on Empirical Methods on Natural Language Processing-CoNLL, pp. 12-21.
Snow et al., 2008. Cheap and fast—but is it good?: evaluating non-expert annotations for natural language tasks. In Proceedings of the conference on empirical methods in natural language processing, pp. 254-263.
Wang and Chiticariu et al., 2017. Active learning for black-box semantic role labeling with neural factors. IJCAI.
Wang and El-Kishky et al., 2015. Incorporating world knowledge to document clustering via heterogeneous information networks. In KDD, pp. 1215-1224.
Wang and Song et al., 2016. Text classification with heterogeneous information network kernels. In AAAI, pp. 2130-2136.

* cited by examiner

| Type | Features |
|---|---|
| Task-level features | Frame label; role label; question type; length of question in # tokens; Wh-word; tokens; lemmas, POS tags of all words in question |
| Sentence-level | # of questions for sentence, # of question types for sentence; # of verbs, # of nouns, # of frames, # of roles in sentence; length of sentence in # tokens; tokens, lemmas and POS tags of all words in sentence; head word and dependency relation to head word |

SEMI-AUTOMATIC PROCESS FOR CREATING A NATURAL LANGUAGE PROCESSING RESOURCE

FIELD

The present application generally relates to information technology, and, more particularly, to natural language processing techniques.

BACKGROUND

Semantic role labeling (SRL) is the task of labeling the predicate-argument structures of sentences with semantic frames and roles corresponding thereto. By way merely of example, consider the phrase "John broke the window." In this phrase, the predicate "break" can be "arg0 predicate arg1," wherein the role for "arg0" is "John," and the role for "arg1" is "the window." SRL is useful for a variety of natural language processing (NLP) tasks such as question-answering, information extraction, machine translation, etc. However, a significant challenge impeding wide adoption of SRL is the need for large amounts of labeled training data to capture broad-coverage semantics. In conventional SRL approaches, such data generally require trained experts and is highly costly to produce.

Crowdsourcing has shown occasional effectiveness in generating labeled data for a range of NLP tasks. An advantage of crowdsourcing is that it allows the annotation workload to be scaled-out among large numbers of inexpensive crowd workers. Accordingly, a number of recent SRL approaches have attempted to leverage crowdsourcing to generate labeled training data for SRL. However, such approaches have found that crowd feedback generally suffers from low inter-annotator agreement scores and often produces incorrect labels.

SUMMARY

In one embodiment of the present invention, techniques for a semi-automatic process for creating a natural language processing resource are provided. An exemplary computer-implemented method can include identifying multiple annotation tasks in connection with natural language processing of a set of input text, and automatically determining, based on analysis of (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users. Such a method can additionally include routing, in accordance with the determined routing instructions, the first sub-set of the identified annotation tasks to the one or more non-expert annotation task users, and routing, in accordance with the determined routing instructions, the second sub-set of the identified annotation tasks to the one or more expert annotation task users.

In another embodiment of the invention, an exemplary computer-implemented method can include obtaining an un-annotated set of input text, and identifying multiple annotation tasks in connection with natural language processing of the un-annotated set of input text. Such a method can also include automatically determining, via employing a trained classifier to analyze (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users. Additionally, such a method can include routing, in accordance with the determined routing instructions, (i) the first sub-set of the identified annotation tasks to the one or more non-expert annotation task users and (ii) the second sub-set of the identified annotation tasks to the one or more expert annotation task users. Further, such a method can also include compiling annotation task responses for (i) the first sub-set of the identified annotation tasks from the one or more non-expert annotation task users and (ii) the second sub-set of the identified annotation tasks from the one or more expert annotation task users, and outputting an annotated version of the set of input text based on the compiled annotation task responses.

In yet another embodiment of the invention, an exemplary computer-implemented method can include training a classifier to determine, in view of predetermined criteria that takes into consideration (i) resources required to accomplish one or more semantic role labeling tasks for natural language processing and (ii) quality of the output from one or more semantic role labeling tasks, whether a given semantic role labeling task (a) should be performed by one or more non-experts or (b) should be performed by one or more experts; applying the trained classifier to the semantic role labeling task; and automatically assigning the semantic role labeling task, in accordance with the application of the trained classifier, to the one or more non-experts or the one or more experts.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes a semi-automatic process for creating a natural language processing resource. As noted herein, while producing SRL annotations often requires expert involvement, certain SRL tasks are appropriate for crowdsourcing. As used herein, an "expert" can refer to a computational linguist trained with annotation guidelines. Also as further described herein, one or more embodiments of the invention include employing a classifier to identify annotation tasks and selectively route each identified task to experts or crowd workers, according to one or more determined parameters.

Accordingly, one or more embodiments of the invention include training a classifier to determine whether annotation tasks (such as, for example, SRL) for NLP are to be performed by non-experts (for example, crowd workers) or by experts, in view of one or more pre-determined criteria that take into consideration resources (time, costs, expert availability, etc.) to accomplish the tasks and the estimated quality of the output (based on parameters such as the difficulty of the tasks, the skill sets and/or expertise levels of the workers/experts, etc.).

As detailed herein, there can be significant differences in difficulty levels among SRL annotation tasks, depending on factors such as the complexity of a specific sentence, the difficulty of a specific semantic role, etc. Accordingly, one or more embodiments of the invention include determining and/or identifying a sub-set of particular annotation tasks to be assigned to crowd workers, while determining and/or identifying a distinct sub-set of particular annotation tasks to be assigned to designated expert users.

At least one embodiment of the invention includes implementing a hybrid annotation approach that involves both crowd workers and experts. In this hybrid annotation approach, annotation tasks are analyzed by a decision function that classifies the annotation tasks as either crowd-appropriate or expert-required, and subsequently sends the annotation tasks to crowd workers or expert annotators accordingly. Such a hybrid annotation approach creates annotated SRL data using both crowd workers and experts, and consequently reduces overall labeling costs by leveraging crowdsourcing when deemed possible, while maintaining annotation quality by involving experts when deemed necessary.

As used herein, an annotation task can include a sentence, a human-readable question regarding a predicted label, and/or a set of answer options. As detailed in connection with one or more embodiments of the invention, a classification problem can be defined in which an annotation task is classified into one of the two following classes: (i) crowdsourcing-appropriate and (ii) expert-required. A crowdsourcing-appropriate annotation task refers to a task for which crowd workers agree on the answer, and the agreed-upon answer is correct. In one or more embodiments of the invention, the level of crowd worker agreement can be required to be 100%, or it can be required to exceed a pre-defined threshold. An expert-required annotation task refers to a task that is not crowdsourcing-appropriate.

Figure 1:
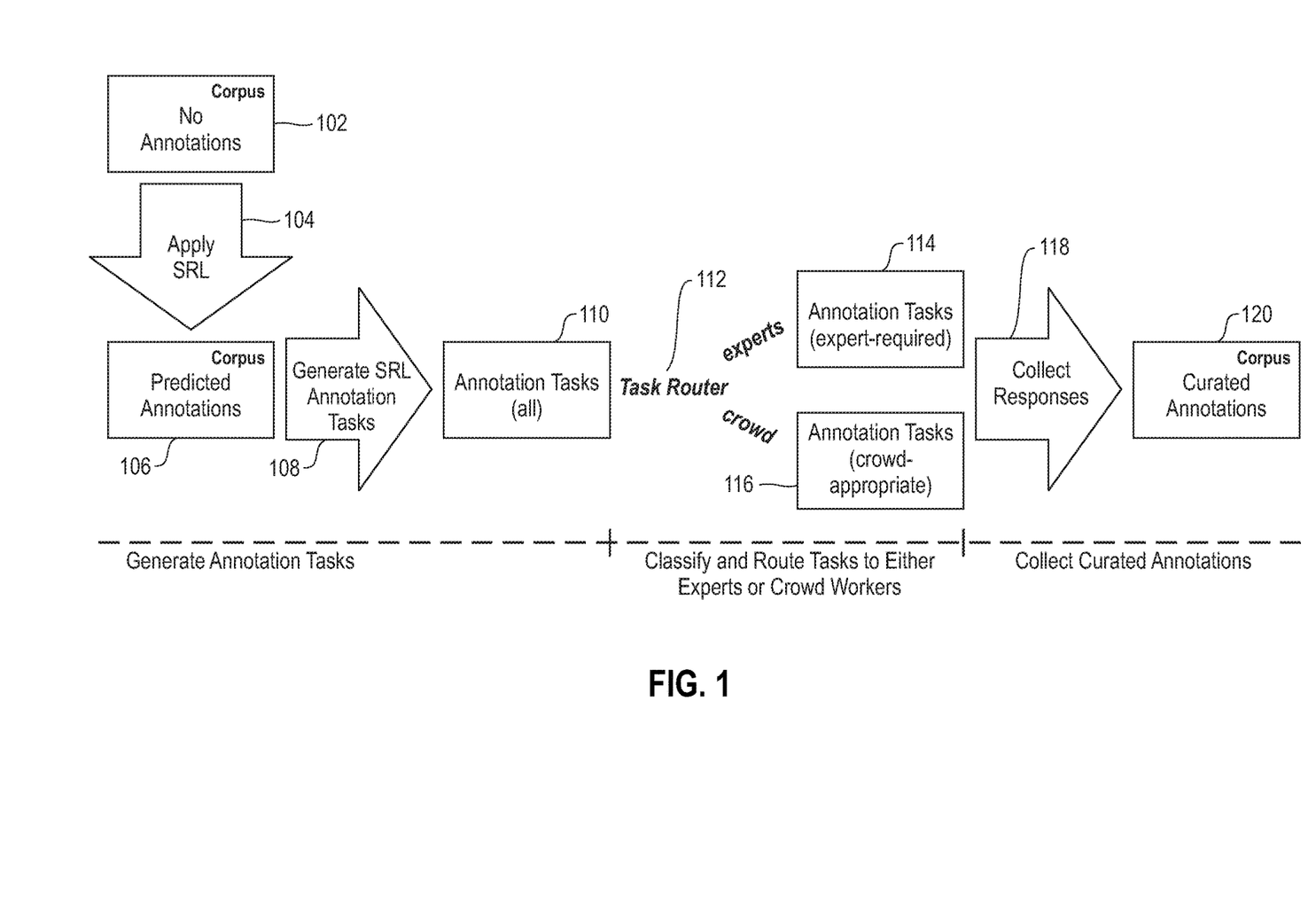
FIG. 1 is a diagram illustrating an overview for curating SRL annotations, according to an exemplary embodiment of the invention.

FIG. 1 is a diagram illustrating an overview for curating SRL annotations, according to an exemplary embodiment of the invention. By way of illustration, FIG. 1 depicts a corpus of documents/text 102 with no annotations, to which SRL is applied in step 104 to generate a corpus of predicted annotations 106. Based on this corpus of predicted annotations 106, SRL annotation tasks are generated in step 108, resulting in a set of annotation tasks 110. A task router 112 analyzes the annotation tasks 110, and based on such analysis, routes a sub-set of the annotation tasks 114 to expert users for labeling and routes a sub-set of the annotation tasks 116 to crowd workers for labeling. Step 118 includes collecting responses from the expert users and crowd workers, ultimately resulting in a corpus of curated annotations 120.

Figure 2:
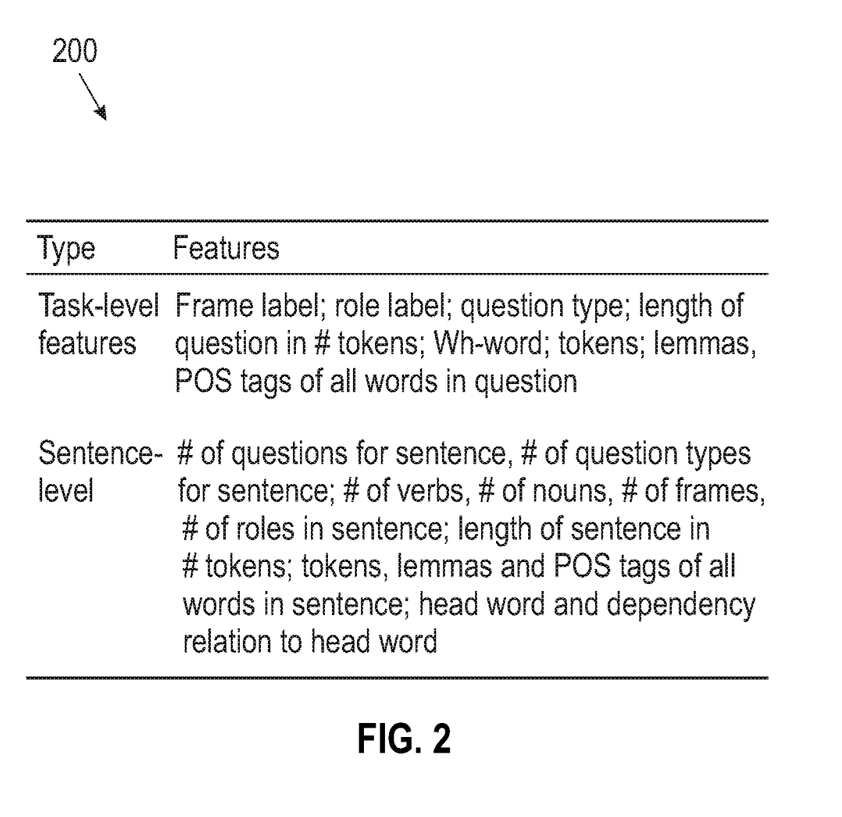
FIG. 2 is a table illustrating features for annotation task classification, according to an exemplary embodiment of the invention.

FIG. 2 is a table 200 illustrating features for annotation task classification, according to an exemplary embodiment of the invention. As described herein, to solve a task classification problem, one or more embodiments of the invention include utilizing two groups of distinct features: (i) task-level features and (ii) sentence-level features.

Task-level features $X^g$ can capture the general difficulty of a labeling task, as defined by a frame or role type. Accordingly, as incorporated via one or more embodiments of the invention, certain frames and/or roles are difficult for non-experts, and annotation tasks related to such frames and/or roles are preferably handled by experts. Task-level features, as illustrated in table 200, can include the frame and role labels themselves, as well as the complexity of each question measured in features such as the question word (what, how, when, etc.), the question's length measured in number of tokens, as well as all tokens, lemmas and part-of-speech (POS) tags in the question. As used herein, a "token" can refer to one or more individual words. For alphabetic languages, a token can refer to a string of contiguous characters between two spaces, or between a space and punctuation marks.

Sentence-level features $X^l$ can capture the complexity associated with the specific task instance. As is to be appreciated, some sentences are more complex and more difficult to understand than others. In such sentences, even roles with generally crowd-appropriate definitions might be incorrectly answered by non-experts. Accordingly, one or more embodiments of the invention can include capturing the complexity of a sentence using features such as the sentence's length (as measured, for example, by the number of tokens in the sentence), the number of frames, roles, verbs, and nouns in the sentence, as well as all tokens, lemmas and POS-tags in the sentence.

In addition to task- and sentence-level features, at least one embodiment of the invention includes generating and/or implementing a classifier that models the interplay between multiple annotation tasks generated from the same sentence. Such an embodiment assumes that there is an interdependence between labeling decisions in the same sentence. For example, the presence of a difficult role may alter the interpretation of a sentence and make other labeling decisions more complicated. Accordingly, one or more embodiments of the invention include implementing a fuzzy classification model with multiple layers of support vector machine (SVM) classifiers, which introduces the context of a task using fuzzy indicators to model the interplay between groups of features.

For example, such an embodiment can include training a local-layer SVM classifier $\mathcal{L}^l$ using sentence-level features $X^l$ (computed from sentences), and also training a global-layer SVM classifier $\mathcal{L}^g$ using task-level features $X^g$ (computed from tasks). The predictions of the local and global classifiers are referred to as fuzzy indicators, and these fuzzy indicators can be incorporated as additional features into a fuzzy two-layer SVM classifier $\mathcal{L}^f$ as follows. Given task $a_i$ among all tasks $a_1$ to $a_n$ for a sentence s, the first layer of the fuzzy classifier includes applying the local-layer classifier using the sentence-level features of s. The second layer of the fuzzy classifier includes applying the global-layer classifier n times, each time using task-level features for task $a_j$, $1 \leq j \leq n$, resulting in n+1 values: one local-layer indicator and n global-layer indicators. The final fuzzy classifier model uses the n+1 local and global indicators as features, in addition to the sentence- and task-level features of $a_i$.

Note that the classification of task $a_i$ considers features from other tasks $a_j$ from the same sentence, but more efficiently than placing all task-level features of all tasks into a single feature vector. Formally, the objective function of the fuzzy two-layer SVM classification model $\mathcal{L}^f$ can be represented as:

$$\max_\alpha 1^T \alpha - \frac{1}{2} \alpha^T Y K(X^{f^T} X^f) Y \alpha, \text{ such that } y^T \alpha = 0, 0 \leq \alpha \leq C1,$$

wherein $K(X^f X^f)$ is the fuzzy two-layer radial basis function (RBF) kernel function, $X^f = [X^{g^T}, X^{l^T}, Y_1^{g^T}, \ldots, Y_j^{g^T}, \ldots, Y_n^{g^T}, Y^{l^T}]$ is the fuzzy two-layer feature matrix, n is the number of annotation tasks generated from a sentence, $Y_j^g$ represents the $j^{th}$ fuzzy indicator generated by the $j^{th}$ global classifier $\mathcal{L}^g_j$, $Y^l$ is the fuzzy indicator generated by the local classifier $\mathcal{L}^l$, Y is the label matrix, 1 is a vector of all ones and C is a positive trade-off parameter.

Figure 3:
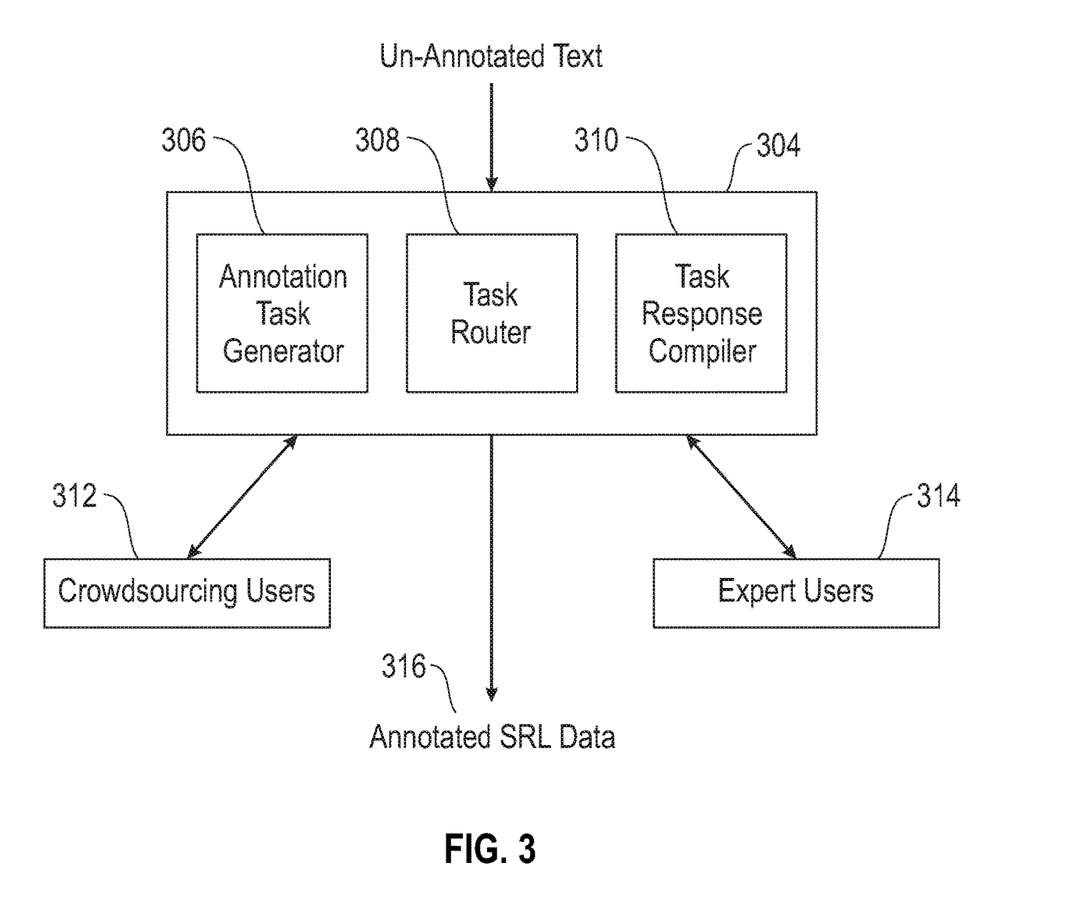
FIG. 3 is a diagram illustrating system architecture, according to an exemplary embodiment of the invention.

FIG. 3 is a diagram illustrating system architecture, according to an exemplary embodiment of the invention. By way of illustration, FIG. 3 depicts un-annotated text 302 provided to NLP resource system 304, which includes an annotation task generator 306, a task router 308, and a task response compiler 310. The annotation task generator analyzes the input text 302 and determines and generates annotation tasks related thereto. The task router 308 analyzes the generated annotation tasks and determines, based on one or more parameters, to route certain ones of the generated annotation tasks to crowdsourcing users 312 and certain ones of the generated annotation tasks to expert users 314. The task response compiler 310 collects the annotation task responses from the crowdsourcing users 312 and the expert users 314 and, based on these collected responses, the NLP resource system 304 outputs annotated SRL data 316 related to the input text 302.

Figure 4:
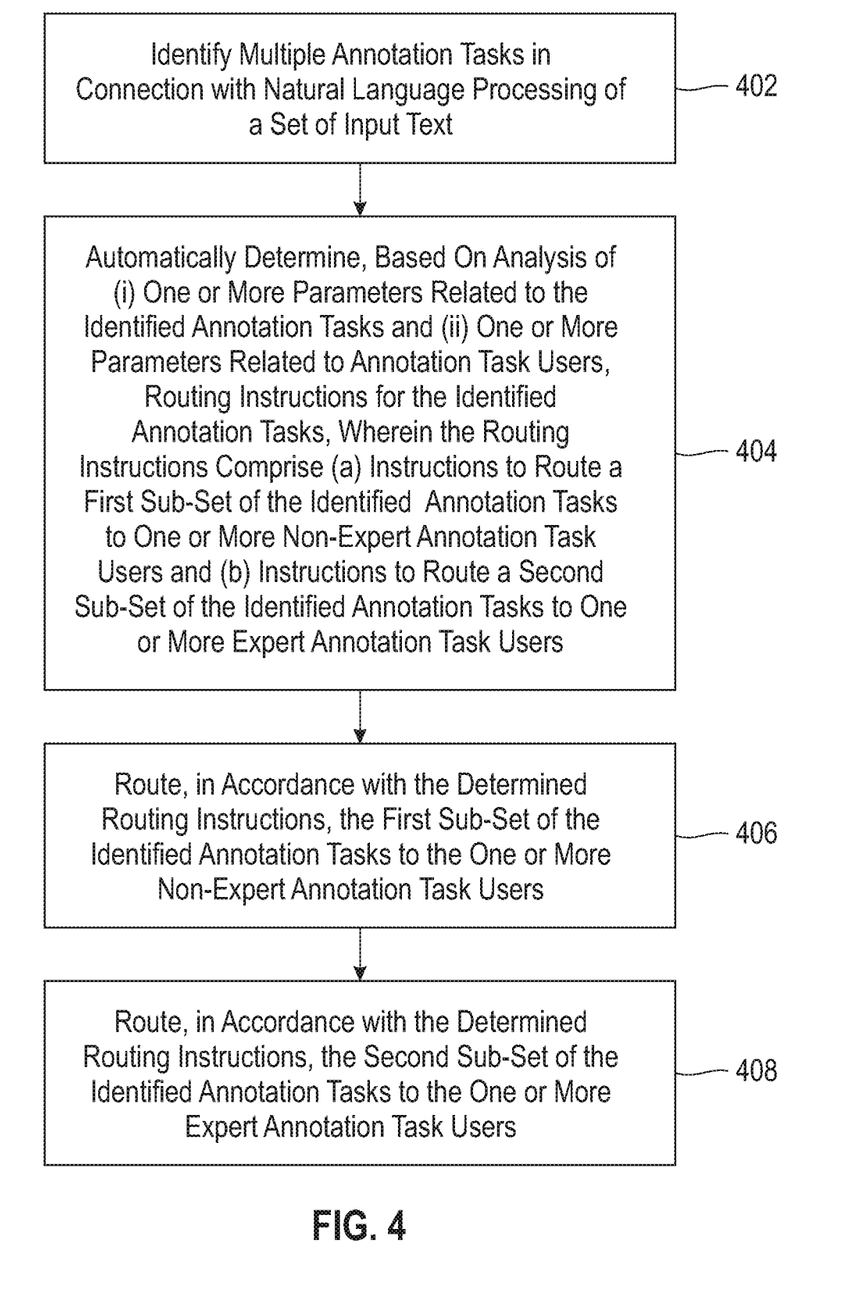
FIG. 4 is a flow diagram illustrating techniques according to an embodiment of the invention.

FIG. 4 is a flow diagram illustrating techniques according to an embodiment of the present invention. Step 402 includes identifying multiple annotation tasks in connection with natural language processing of a set of input text. The multiple annotation tasks can include one or more semantic role labeling tasks.

Step 404 includes automatically determining, based on analysis of (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users. The one or more non-expert annotation task users can include one or more crowdsourcing annotation task users. Also, automatically determining the routing instructions can include implementing a classifier that models an interplay between the identified annotation tasks. Additionally, one or more embodiments of the invention can further include training the classifier.

The one or more parameters related to the identified annotation tasks can include time required to complete each of the identified annotation tasks, costs required to complete each of the identified annotation tasks, and/or difficulty of each of the identified annotation tasks. The one or more parameters related to the annotation task users can include availability of expert annotation task users, a skill set of each of the annotation task users, estimated quality of output generated by expert annotation task users for each of the identified annotation tasks, and/or estimated quality of output generated by non-expert annotation task users for each of the identified annotation tasks.

Step 406 includes routing, in accordance with the determined routing instructions, the first sub-set of the identified annotation tasks to the one or more non-expert annotation task users. Step 408 includes routing, in accordance with the determined routing instructions, the second sub-set of the identified annotation tasks to the one or more expert annotation task users.

Also, an additional embodiment of the invention includes obtaining an un-annotated set of input text, and identifying multiple annotation tasks in connection with natural language processing of the un-annotated set of input text. Such an embodiment can also include automatically determining, via employing a trained classifier to analyze (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users. Additionally, such an embodiment can include routing, in accordance with the determined routing instructions, (i) the first sub-set of the identified annotation tasks to the one or more non-expert annotation task users and (ii) the second sub-set of the identified annotation tasks to the one or more expert annotation task users. Further, such an embodiment can also include compiling annotation task responses for (i) the first sub-set of the identified annotation tasks from the one or more non-expert annotation task users and (ii) the second sub-set of the identified annotation tasks from the one or more expert annotation task users, and outputting an annotated version of the set of input text based on the compiled annotation task responses.

Also, yet another additional embodiment of the invention includes training a classifier to determine, in view of predetermined criteria that takes into consideration (i) resources required to accomplish one or more semantic role labeling tasks for natural language processing and (ii) quality of the output from one or more semantic role labeling tasks, whether a given semantic role labeling task (a) should be performed by one or more non-experts or (b) should be performed by one or more experts. Such an embodiment additionally includes applying the trained classifier to the semantic role labeling task, and automatically assigning the semantic role labeling task, in accordance with the application of the trained classifier, to the one or more non-experts or the one or more experts.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
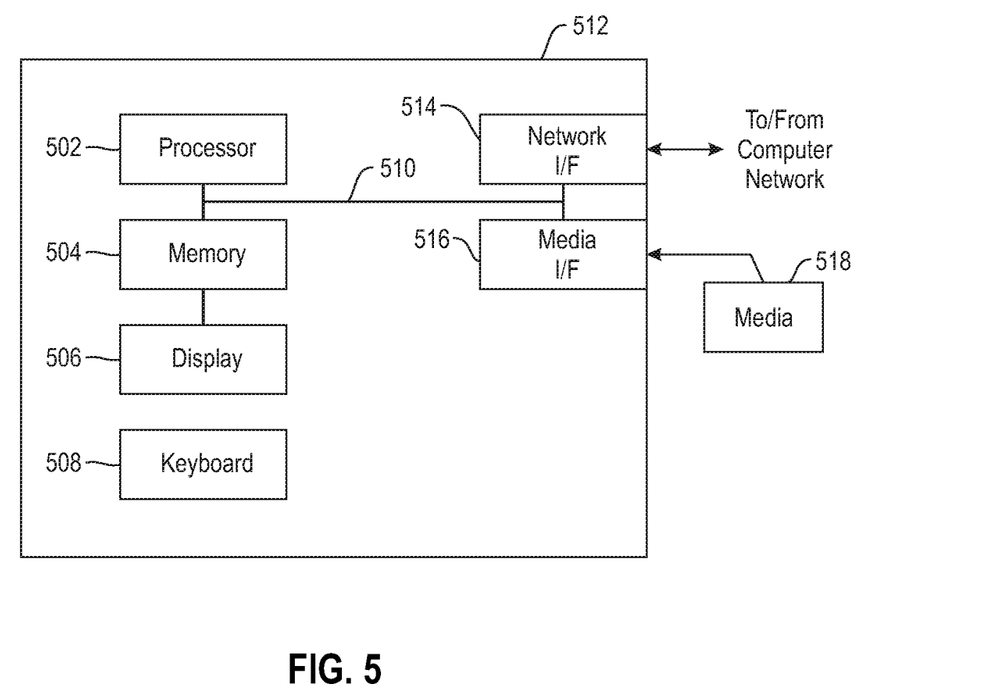
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
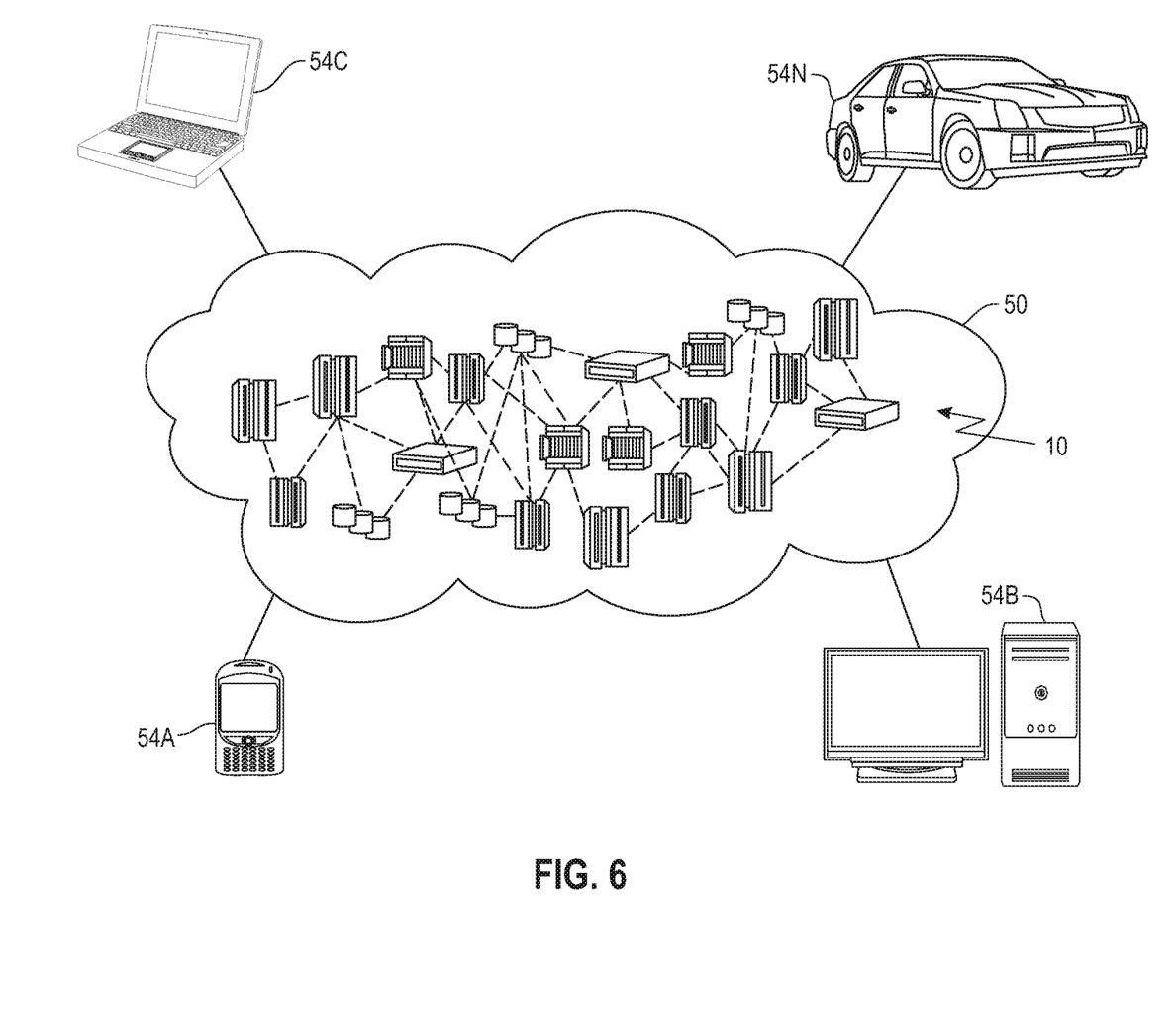
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
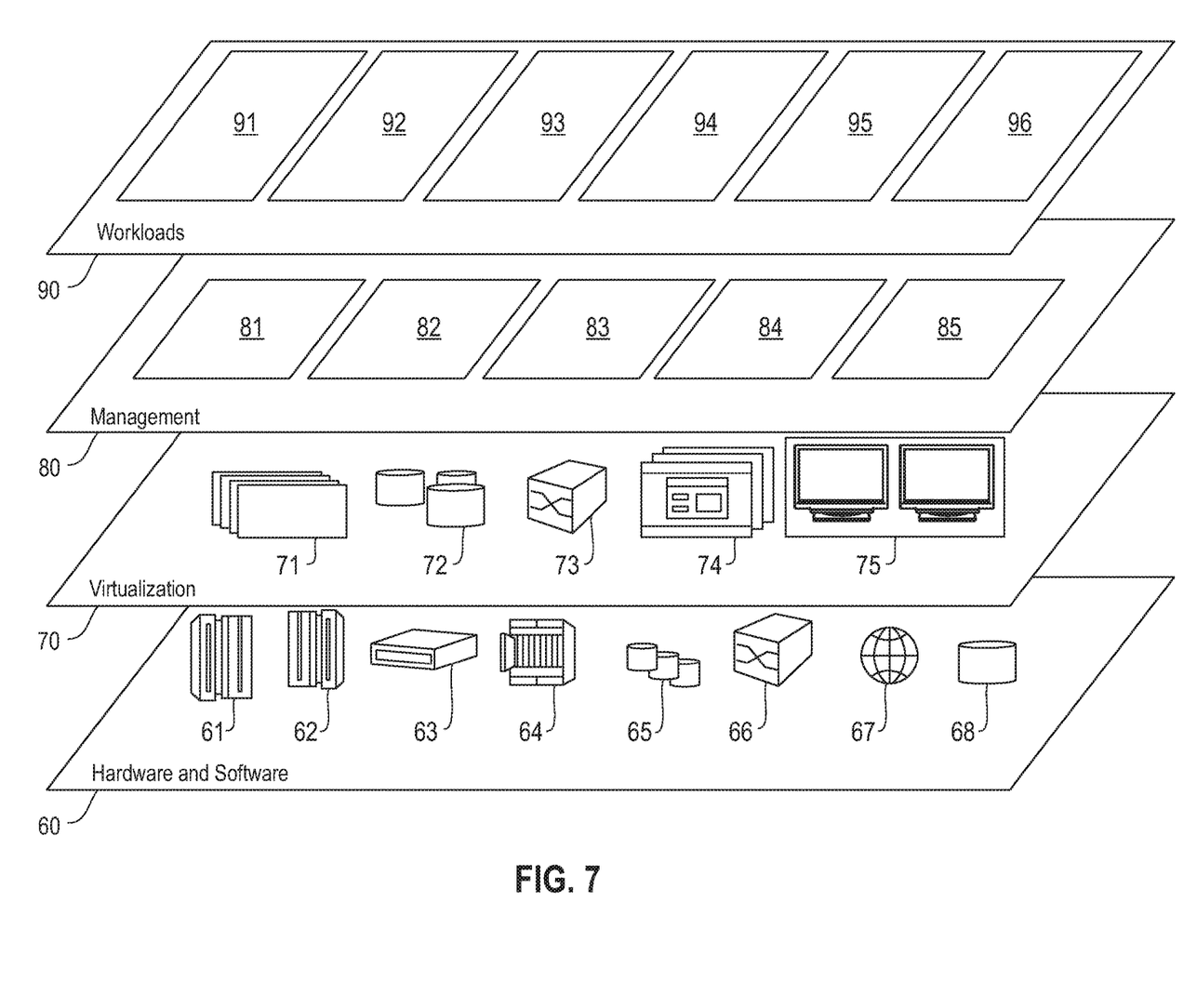
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SRL annotation curation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, creating annotated SRL data with both crowd workers and experts, which reduces overall labeling costs by selectively leveraging the crowd, and maintains annotation quality by selectively involving experts.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    identifying multiple annotation tasks in connection with natural language processing of a set of input text;
    automatically determining, based on analysis of (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users;
    routing, in accordance with the determined routing instructions, the first sub-set of the identified annotation tasks to the one or more non-expert annotation task users;
    routing, in accordance with the determined routing instructions, the second sub-set of the identified annotation tasks to the one or more expert annotation task users;
    generating annotation task responses for (i) the first sub-set of the identified annotation tasks from the one or more non-expert annotation task users and (ii) the second sub-set of the identified annotation tasks from the one or more expert annotation task users; and
    performing one or more automated actions based at least in part on the generated annotation task responses;
    wherein the steps are carried out by at least one computing device.

2. The computer-implemented method of claim 1, wherein the multiple annotation tasks comprise one or more semantic role labeling tasks.

3. The computer-implemented method of claim 1, wherein said automatically determining comprises implementing a classifier that models an interplay between the identified annotation tasks.

4. The computer-implemented method of claim 3, comprising:
    training the classifier.

5. The computer-implemented method of claim 1, wherein the one or more non-expert annotation task users comprise one or more crowdsourcing annotation task users.

6. The computer-implemented method of claim 1, wherein the one or more parameters related to the identified annotation tasks comprise time required to complete each of the identified annotation tasks.

7. The computer-implemented method of claim 1, wherein the one or more parameters related to the identified annotation tasks comprise costs required to complete each of the identified annotation tasks.

8. The computer-implemented method of claim 1, wherein the one or more parameters related to the identified annotation tasks comprise difficulty of each of the identified annotation tasks.

9. The computer-implemented method of claim 1, wherein the one or more parameters related to the annotation task users comprise availability of expert annotation task users.

10. The computer-implemented method of claim 1, wherein the one or more parameters related to the annotation task users comprise a skill set of each of the annotation task users.

11. The computer-implemented method of claim 1, wherein the one or more parameters related to the annotation task users comprise estimated quality of output generated by expert annotation task users for each of the identified annotation tasks.

12. The computer-implemented method of claim 1, wherein the one or more parameters related to the annotation task users comprise estimated quality of output generated by non-expert annotation task users for each of the identified annotation tasks.

13. A computer program product comprising a computer readable storage medium having program instructions embodied therewith, the program instructions executable by a computing device to cause the computing device to:
    identify multiple annotation tasks in connection with natural language processing of a set of input text;
    automatically determine, based on analysis of (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users;

route, in accordance with the determined routing instructions, the first sub-set of the identified annotation tasks to the one or more non-expert annotation task users;

route, in accordance with the determined routing instructions, the second sub-set of the identified annotation tasks to the one or more expert annotation task users;

generate annotation task responses for (i) the first sub-set of the identified annotation tasks from the one or more non-expert annotation task users and (ii) the second sub-set of the identified annotation tasks from the one or more expert annotation task users; and perform one or more automated actions based at least in part on the generated annotation task responses.

14. The computer program product of claim 13, wherein said automatically determining comprises implementing a classifier that models an interplay between the identified annotation tasks.

15. A system comprising:

a memory; and at least one processor operably coupled to the memory and configured for:

identifying multiple annotation tasks in connection with natural language processing of a set of input text;

automatically determining, based on analysis of (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users;

routing, in accordance with the determined routing instructions, the first sub-set of the identified annotation tasks to the one or more non-expert annotation task users;

routing, in accordance with the determined routing instructions, the second sub-set of the identified annotation tasks to the one or more expert annotation task users;

generating annotation task responses for (i) the first sub-set of the identified annotation tasks from the one or more non-expert annotation task users and (ii) the second sub-set of the identified annotation tasks from the one or more expert annotation task users; and performing one or more automated actions based at least in part on the generated annotation task responses.

16. A computer-implemented method, the method comprising steps of:

obtaining an un-annotated set of input text;

identifying multiple annotation tasks in connection with natural language processing of the un-annotated set of input text;

automatically determining, via employing a trained classifier to analyze (i) one or more parameters related to the identified annotation tasks and (ii) one or more parameters related to annotation task users, routing instructions for the identified annotation tasks, wherein the routing instructions comprise (a) instructions to route a first sub-set of the identified annotation tasks to one or more non-expert annotation task users and (b) instructions to route a second sub-set of the identified annotation tasks to one or more expert annotation task users;

routing, in accordance with the determined routing instructions, (i) the first sub-set of the identified annotation tasks to the one or more non-expert annotation task users and (ii) the second sub-set of the identified annotation tasks to the one or more expert annotation task users;

compiling annotation task responses for (i) the first sub-set of the identified annotation tasks from the one or more non-expert annotation task users and (ii) the second sub-set of the identified annotation tasks from the one or more expert annotation task users; and outputting an annotated version of the set of input text based on the compiled annotation task responses;

wherein the steps are carried out by at least one computing device.

17. The computer-implemented method of claim 16, wherein the multiple annotation tasks comprise one or more semantic role labeling tasks.

18. The computer-implemented method of claim 16, wherein the trained classifier comprises a classifier that models an interplay between the identified annotation tasks.

19. The computer-implemented method of claim 16, comprising:

training the classifier.

20. A computer-implemented method, the method comprising steps of:

training a classifier to determine, in view of predetermined criteria that takes into consideration (i) resources required to accomplish one or more semantic role labeling tasks for natural language processing and (ii) quality of the output from one or more semantic role labeling tasks, whether a given semantic role labeling task (a) should be performed by one or more non-experts or (b) should be performed by one or more experts;

applying the trained classifier to the semantic role labeling task; and automatically assigning the semantic role labeling task, in accordance with the application of the trained classifier, to the one or more non-experts or the one or more experts.

* * * * *